Oct. 14, 1924.  
T. C. COOPER  
TIRE GAUGE  
Filed Nov. 28, 1921  
1,511,709
Fig.1.  Fig.2.  Fig.3.
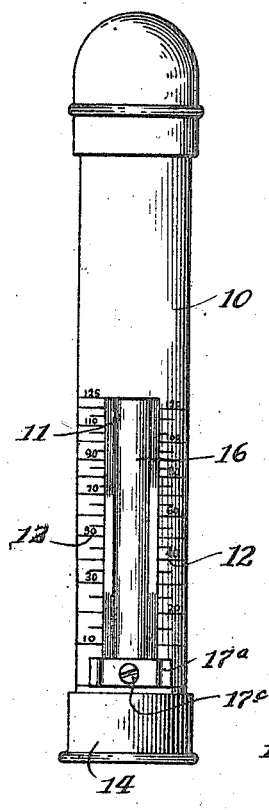
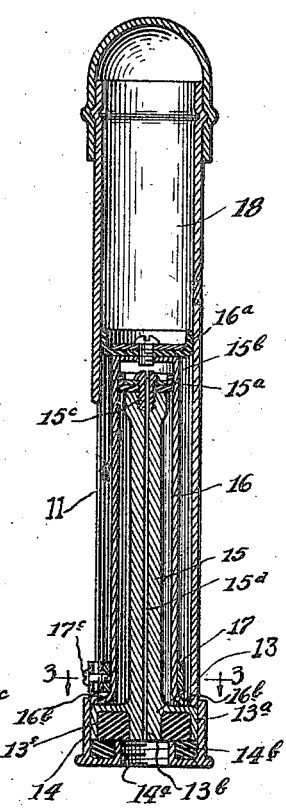
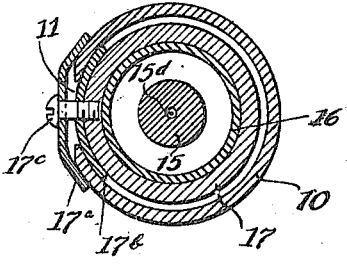
Fig.4.
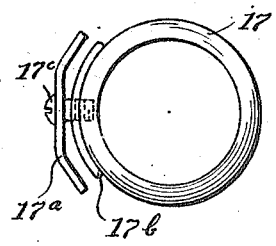
Fig.5.
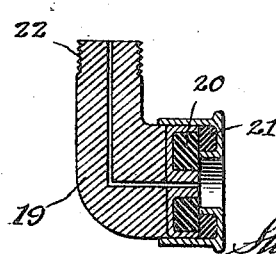
Inventor  
Thomas C. Cooper.  
By Sheridan, Jones, Sheridan & Smith.  
Atty's Patented Oct. 14, 1924.

1,511,709

UNITED STATES PATENT OFFICE.

THOMAS C. COOPER, OF CHICAGO, ILLINOIS.

TIRE GAUGE.

Application filed November 28, 1921. Serial No. 518,129.

*To all whom it may concern:*

Be it known that I, THOMAS C. COOPER, a citizen of the United States, residing at Chicago, in the county of Cook and State of Illinois, have invented certain new and useful Improvements in Tire Gauges, of which the following is a specification.

This invention relates to improvements in pressure gauges for pneumatic tires.

One object of the invention is to provide a gauge of this character which shall be simple in construction and operation, economical to manufacture and one wherein the use of all springs, such as now commonly employed in gauges of this character, may be dispensed with.

Other objects of the invention will be apparent to those skilled in the art from a reading of the following specification, taken in connection with the accompanying drawings wherein one form of the invention is illustrated.

In the drawings—

Figure 1 is a side elevation of a gauge constructed in accordance with the present invention.

Fig. 2 is a longitudinal sectional view.

Fig. 3 is a sectional view taken on the line 3—3 of Fig. 2.

Fig. 4 is a plan view of the pressure indicating means; and

Fig. 5 is a sectional view of an elbow attachment for use with the gauge when an air valve is encountered which does not permit of the gauge being employed in the usual way.

As is well known, the tire gauges now in use embody in their construction an elongated coil spring for counteracting the upward or outward movement of the gauge bar or its equivalent, and for returning the latter to its normal position immediately upon the release of the fluid pressure being measured. In other words, these springs in the gauges now on the market form the basis for the pressure reading calibrations.

The present improvements contemplate the provision of a gauge of the character described, which shall operate on what may be termed the dash pot or air cushion principle, utilizing the same both as the basis for the pressure reading calibrations and for returning the pressure responsive element of the gauge to its normal position each time the fluid pressure being measured is released. In this way the use of all springs may be entirely dispensed with.

Referring more in detail to the drawings the gauge is shown as comprising an outer cylindrical barrel or casing 10, closed at its upper end and open at its lower end, and provided with an elongated longitudinally extended slot 11 in its side wall, said slot extending from the lower open end thereof upwardly and terminating substantially midway of the ends of the casing. The longitudinal edges of this slot may be beveled, if desired, as shown in the drawings and at opposite sides of the slot the casing is provided with graduations 12, the latter being numbered in staggered relation from one side of the slot to the other and beginning at the bottom of the casing and extending upwardly therefrom to a point adjacent the upper end of the slot.

A suitable deflating element 13 is held firmly against the lower edge of the casing 10 by means of a ferrule or thimble 14, which engages tightly over the lower end of the casing 10 in such wise as to hold the deflating element firmly in position. The deflating element 13 is in the form of a downwardly turned cup $13^a$ which may be of metal or other suitable material, said cup being provided with a downwardly extending centrally apertured nipple $13^b$, which may be formed integrally with the base of the cup $13^a$. An annular washer or gasket $13^c$ is fitted into the cup, the outer face thereof lying substantially flush with the edges thereof and the lower end of the nipple as shown more clearly in Fig. 2 of the drawings. The ferrule or thimble 14 is provided with a central opening surrounding which is an inturned flange $14^a$, the latter engaging against the face of the rubber washer $13^c$. The thimble 14 is also provided with a washer $14^b$ which is preferably of metal and which also coacts with the rubber washer $13^c$ in sealing the connection between the thimble and the deflating element. Carried by the deflating element and extending upwardly therefrom to a point above the upper end of the slot 11 is a post or other fixed element 15, the same carrying at its upper end a suitable piston head 15ᵃ which may preferably include the usual leather cup or the like 15ᵇ, the latter being secured to the upper end of the fixed element 15 by means of a screw or other retaining element 15ᶜ. The fixed element 15 is provided with a longitudinally extending duct 15ᵈ which registers at its lower end with the duct in the nipple 13ᵇ and at its upper end opens above the piston head 15ᵃ through a registering duct provided in the screw or retaining element 15ᶜ.

Mounted within the casing or housing 10 is a cylinder 16 open at its lower end and closed at its upper end, said cylinder being preferably of substantially less diameter than that of the casing so that the side walls of the cylinder and casing will be spaced a substantial distance apart. Normally the fixed element 15 carrying the piston head 15ᵃ at its upper end extends upwardly into the cylinder 16, to a point in close proximity to the upper closed end of said cylinder, as shown in Fig. 2, the piston head 15ᵃ engaging the side walls of said cylinder and serving to seal the space between the said head and the upper end of the cylinder. The cylinder 16 at its upper closed end carries a piston head 16ᵃ which may be of the same construction as piston 15ᵃ previously described. This piston head 16ᵃ engages the side walls of the casing 10 above the upper end of the slot 11 and serves to seal the space between said head and the upper closed end of said casing. The lower end of the cylinder 16 is flared outwardly as at 16ᵇ and normally engages the upper surface of the cup 13ᵃ of the deflating element, said element in this way acting as a stop for limiting the downward movement of the cylinder 16. A collar 17 surrounds the cylinder 16 above the lower flared end 16ᵇ and is disposed intermediate the wall thereof and the adjacent inner wall of the outer casing 10. This collar 17 carries a plurality of fingers 17ᵃ and 17ᵇ, the latter engaging the inner surface of the wall of the casing 10 at opposite sides of the slot 11 and the former engaging the outer surface of said wall at opposite sides of the slot. Suitable retaining means, shown in the drawings in the form of a set screw 17ᶜ, may be employed for holding these fingers 17ᵃ and 17ᵇ in proper adjusted position so that the same will serve to hold the collar 17 in any of its indicating positions to which it may be moved during the operation of the gauge as hereinafter described. The outer finger 17ᵃ serves as the indicator and is adapted to be read in conjunction with the calibrations or graduations 12 provided on each side of the slot 11. To this end the finger 17ᵃ may be suitably notched at its opposite ends for reading in conjunction with the graduations on the wall of the casing 10, or, if desired, the upper or lower edge of the finger may be employed for this purpose.

In the use of the gauge, the same is placed over the valve casing of a pneumatic tire, said casing being received within the central opening defined by the flange 14ᵃ of the thimble 14. The gauge is then pressed firmly down on the valve casing during which operation the nipple 13ᵇ engages the upper end of the valve stem and unseats the valve, thereby permitting a portion of the fluid under pressure within the tire to flow upwardly through the duct 15ᵈ and into the space between the piston head 15ᵃ and the upper closed end of the cylinder 16. This causes the cylinder 16 to be raised until the pressure of the air compressed within the space 18 between the piston head 16ᵃ and the upper closed end of the casing 10 counterbalances the fluid pressure being measured or that within the space between the piston head 15ᵃ and the upper closed end of the cylinder 16. The collar 17 together with the indicating finger 17ᵃ is raised a distance equal to that through which the cylinder 16 is raised owing to the engagement between the collar 17 and the outwardly flared lower end 16ᵇ of said cylinder. Immediately upon the removal of the gauge from the valve casing or upon the release of the fluid pressure being measured, the cylinder 16 is returned to its normal position with its lower end in engagement with the top of the deflating element 13 by the air which was compressed in the space 18 during the upward travel of the cylinder. During this return movement of the cylinder 16, however, the collar 17, and the indicating means carried thereby, remains in its indicating position for the fluid pressure just measured, owing to the engagement of the fingers 17ᵃ and 17ᵇ with the wall of the outer casing 10, as previously described. When it is desired to take another reading the collar 17 may be returned to its lowermost position and in engagement with the outwardly flared end 16ᵇ by merely grasping the finger 17ᵃ and moving the same downwardly. If desired, a drop or two of oil may be placed around the edges of the two leather cups of the piston heads 15ᵃ and 16ᵃ as a further step in sealing the chambers or spaces above said piston heads and in rendering the same substantially airtight.

In Fig. 5 an elbow 19 is shown, the latter being provided at one end with a deflating element 20 and a thimble or ferrule 21 both constructed and arranged as the corresponding elements of the gauge previously described. The other end of the elbow 19 is screw threaded as at 22 and adapted to be screwed into the central opening provided in the ferrule or thimble 14 of the gauge, said opening being correspondingly screw threaded for receiving the same. In this way the gauge may be employed for measuring the air pressure in tires which may be attached to certain types of disk or wire wheels, where access to the air valves would otherwise be so obstructed as to render the use of the gauge, without some such attachment, impossible.

It will be obvious to those skilled in the art that the present improvements are susceptible to change and modification, and it is not, therefore, desired to restrict the same except where limitations appear in the appended claims.

What I claim is —

1. In a pressure gauge, a plurality of inter fitting cylinders open at their lower ends and closed at their upper ends, the inner cylinder being longitudinally movable within the outer cylinder and the space between the closed ends of said cylinders being substantially airtight, means for conducting the fluid under pressure into said inner cylinder to raise the latter, thereby ensmalling said space until the pressure therein and that of said fluid are counterbalanced, and means associated with said inner cylinder for indicating such pressure.

2. In a tire gauge, a cylindrical outer casing opened at one end and closed at the other, a plurality of piston heads within said casing one being stationary and the other movable, the latter being disposed intermediate the former and the closed end of said casing, means for conducting the fluid under pressure to the space between said pistons, and means associated with said movable piston for indicating the movements thereof in terms of pressure.

3. In a tire gauge, a cylindrical casing open at its lower end and closed at its upper end and having a longitudinally extending slot in the side wall thereof, a cylinder open at its lower end mounted within said casing and provided with a piston head at its upper end spaced from the closed end of said casing and engaging the wall of the latter, deflating means at the open end of said casing, a fixed element extending upwardly from said means into said cylinder and carrying a piston head at its upper end which engages the side walls of said cylinder, said deflating means, said fixed element and the piston head carried thereby being provided with a common air passage, and pressure indicating means extending through said slot and movable with said cylinder in one direction.

4. In a tire gauge, a cylindrical casing open at its lower end and closed at its upper end and having a longitudinally extending slot in the side wall thereof, a cylinder open at its lower end mounted within said casing and provided with a piston head at its upper end spaced from the closed end of said casing and engaging the wall of the latter, deflating means at the lower end of said casing, a fixed element extending upwardly from said means into said cylinder and carrying a piston head at its upper end which engages the side walls of said cylinder, a duct extending through said deflating means, said fixed element and the piston head carried thereby, pressure indicating means visible through said slot and movable with said cylinder in one direction, and means for retaining said last named means in its operative indicating position for each reading independently of said cylinder.

5. In a tire gauge, a cylindrical casing opened at its lower end and closed at its upper end and having a longitudinally extending slot in the side wall thereof, a cylinder open at its lower end mounted within said casing and provided with a piston head at its upper end spaced from the closed end of said casing and engaging the wall of the latter, deflating means at the lower end of said casing, a fixed element extending upwardly from said means into said cylinder and carrying a piston head at its upper end which engages the side walls of said cylinder, a duct extending through said deflating means, said fixed element and the piston head carried thereby, pressure indicating means visible through said slot and movable with said cylinder in one direction, and means for retaining said last named means in its operative indicating position for each reading independently of said cylinder, the air compressed between the piston head of said cylinder and the closed end of said casing during each operation of said gauge serving to return said cylinder to normal position upon the release of the pressure being measured.

In testimony whereof, I have subscribed my name.

THOMAS C. COOPER.